July 16, 1929. K. STAHL 1,720,928
AIRSHIP TRUCK
Filed March 7, 1922 2 Sheets-Sheet 1

INVENTOR:
Karl Stahl.
by [signature]
Attorney.

July 16, 1929.  K. STAHL  1,720,928
AIRSHIP TRUCK
Filed March 7, 1922    2 Sheets-Sheet 2

INVENTOR:
Karl Stahl.

Patented July 16, 1929.

1,720,928

UNITED STATES PATENT OFFICE.

KARL STAHL, OF FRIEDRICHSHAFEN-ON-THE-BODENSEE, GERMANY, ASSIGNOR TO THE FIRM: LUFTSCHIFFBAU ZEPPELIN GESELLSCHAFT MIT BESCHRÄNKTER HAFTUNG, OF FRIEDRICHSHAFEN-ON-THE-BODENSEE, GERMANY.

AIRSHIP TRUCK.

Application filed March 7, 1922, Serial No. 541,832, and in Germany March 10, 1921.

My invention relates to trucks for the transport of airships into and out of the shed. The trucks heretofore used and which the airship is secured to, involve certain drawbacks which are partly connected with the mode of securing the airship to the truck. Rigid connection will cause excessive stresses to occur in a lateral wind in those parts of the airship which are supported on the truck, and this latter is also subjected to considerable stress and liable to be upset so that it is necessary to secure it against tilting by aid of special guide rails, or else to make it very heavy and of broad gage. It has been proposed to secure the airship to the truck in a resilient manner but the drawbacks above mentioned will be overcome only partly by this expedient.

I avoid these drawbacks altogether by providing a rocking connection between the airship and the truck. This is effected by providing the truck with supports resembling a scale beam and adapted to rock about a pivot arranged at right angles to the truck axles, the said supports being adapted to receive and hold the airship cars.

Preferably these supports are made in two parts pivotally connected with one another, resilient means such as laminated springs being inserted between them. Preferably, the wheels of the truck are so disposed as to automatically adjust themselves to the direction of running.

In the drawings affixed to this specification and forming part thereof, two devices embodying my invention are illustrated diagrammatically by way of example.

In the drawings

Figure 1:
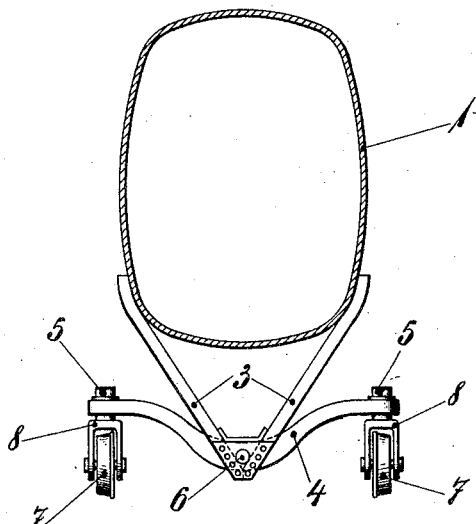
Figs. 1 and 2 are an end elevation and a side elevation, respectively of one device.
Figure 2:
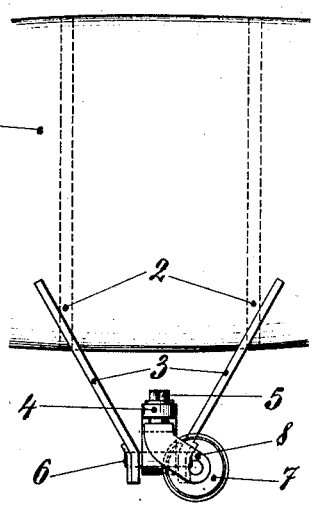

In the device illustrated in Figs. 1 and 2, the airship car 1 is loosely supported at 2 on V-shaped arms 3 which are pivoted to a cross beam 4 by a pin 6. Pivots 5 at the ends of this beam are connected with the wheel forks 8 for the wheels 7.

Figure 3:
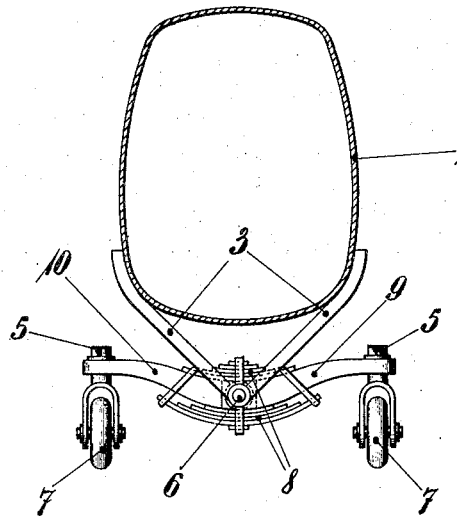
Figs. 3 and 4 are corresponding views of the other device.
Figure 4:
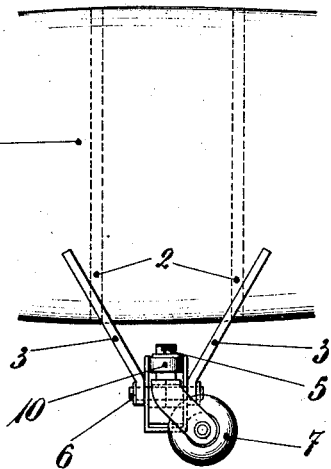
Figure 5:
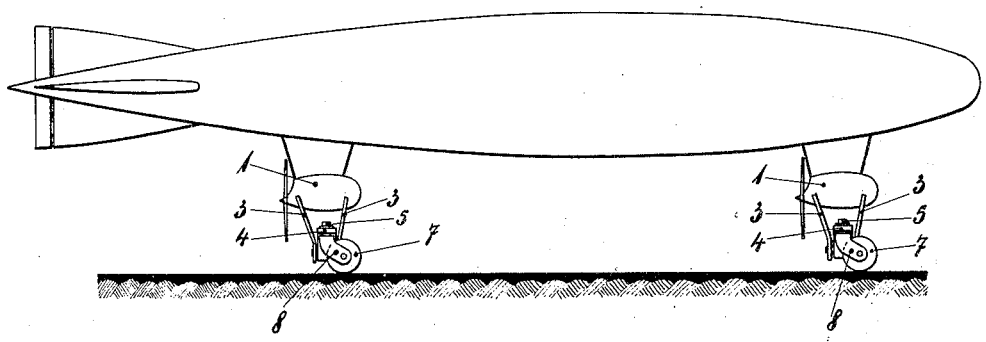
Fig. 5 is a side elevation of the airship supported by the truck.

In the device illustrated in Figs. 3 and 4, the arms 3 turn about a pivot 6. The cross beam is subdivided in two halves 9 and 10 turning about the same pivot. Laminated springs 8 form a connection between the parts 9 and 10.

I wish it to be understood that I do not desire to be limited to the exact details of construction shown and described, for obvious modifications will occur to a person skilled in the art.

I claim:

An airship supporting truck comprising a two-part cross beam structure having a central horizontal pivot pin connecting the two parts and disposed at right angles to the beam, springs connected at the central portion of the cross beam structure to render it yieldable about the pivot pin, a freely mounted swivel wheel supporting each end of the cross beam structure, and two V-shaped airship supporting members pivotallly supported upon the cross beam structure by means of the pivot pin, said V-shaped members providing a support for a portion of an airship.

In testimony whereof I affix my signature.

KARL STAHL.